(12) United States Patent
Dupont et al.

(10) Patent No.: US 9,147,203 B1
(45) Date of Patent: *Sep. 29, 2015

(54) SYSTEM AND METHOD FOR MANAGING INDOOR GEOLOCATION CONVERSIONS

(71) Applicant: Google Inc., Mountain View, CA (US)

(72) Inventors: Cedric Dupont, San Francisco, CA (US); Andrew Lookingbill, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/589,426

(22) Filed: Jan. 5, 2015

Related U.S. Application Data (60) Continuation of application No. 14/445,582, filed on Jul. 29, 2014, now Pat. No. 8,954,276, which is a division of application No. 13/431,141, filed on Mar. 27, 2012, now Pat. No. 8,843,304.

(51) Int. Cl.
| | |
|---|---|
| *G01C 21/00* | (2006.01) |
| *G06Q 30/02* | (2012.01) |
| *H04W 4/04* | (2009.01) |
| *G06Q 30/06* | (2012.01) |

(52) U.S. Cl.
CPC ........ *G06Q 30/0261* (2013.01); *G06Q 30/0207* (2013.01); *G06Q 30/0259* (2013.01); *G06Q 30/0267* (2013.01); *G06Q 30/0273* (2013.01); *G06Q 30/0639* (2013.01); *H04W 4/04* (2013.01)

(58) Field of Classification Search
CPC .... G01C 21/20; G01C 21/00; G01C 21/3423; G01C 21/343; G01C 21/3617; G01C 21/3697
USPC ............ 701/533, 467; 705/14.25, 14.27, 26.1
See application file for complete search history.

(56) References Cited

U.S. PATENT DOCUMENTS

| | | |
|---|---|---|
| 6,289,318 B1 | 9/2001 | Barber |
| 6,766,947 B2 | 7/2004 | Wan et al. |
| 7,027,801 B1 | 4/2006 | Hall et al. |
| 7,532,898 B2 | 5/2009 | Halcrow et al. |
| 7,653,576 B2 | 1/2010 | Boss et al. |
| 7,698,566 B1 | 4/2010 | Stone |
| 7,775,880 B2 | 8/2010 | Downes, P.E. |
| 7,899,403 B2 | 3/2011 | Aaron |

(Continued)

FOREIGN PATENT DOCUMENTS

| | | |
|---|---|---|
| WO | 2008014255 A2 | 1/2008 |
| WO | 2010107817 A1 | 9/2010 |

(Continued)

*Primary Examiner* — Redhwan k Mawari
(74) *Attorney, Agent, or Firm* — Lerner, David, Littenberg, Krumholz & Mentlik, LLP (57) ABSTRACT

The present technology proposes techniques for managing indoor geolocation conversions based on a user's intent in an indoor location. An advertiser may determine the intent of a user of a mobile device and transmit advertisements to the mobile device related to the determined intent. The intent may be determined based on events that include a location of the mobile device, network browsing history, and a transaction made using the mobile device. The advertisement may provide the user with directions to an item based on location information from the mobile device. The advertisements may also load balance geolocation conversions in order to manage a number of users at a particular location.

20 Claims, 10 Drawing Sheets

(56) References Cited

U.S. PATENT DOCUMENTS

| | | |
|---|---|---|
| 8,027,879 B2 | 9/2011 | Ramer et al. |
| 2003/0100315 A1 | 5/2003 | Rankin |
| 2003/0125963 A1 | 7/2003 | Haken |
| 2004/0093274 A1 | 5/2004 | Vanska et al. |
| 2005/0160004 A1 | 7/2005 | Moss et al. |
| 2005/0256782 A1 | 11/2005 | Sands et al. |
| 2007/0239348 A1 | 10/2007 | Cheung |
| 2008/0103887 A1 | 5/2008 | Oldham et al. |
| 2008/0133336 A1 | 6/2008 | Altman et al. |
| 2008/0248815 A1* | 10/2008 | Busch ............... 455/456.5 |
| 2008/0318559 A1 | 12/2008 | Porco |
| 2009/0171559 A1 | 7/2009 | Lehtiniemi et al. |
| 2009/0187466 A1 | 7/2009 | Carter et al. |
| 2010/0008337 A1 | 1/2010 | Bajko |
| 2010/0094878 A1 | 4/2010 | Soroca et al. |
| 2010/0121567 A1 | 5/2010 | Mendelson |
| 2010/0228612 A1 | 9/2010 | Khosravy et al. |
| 2010/0318407 A1 | 12/2010 | Leff et al. |
| 2010/0318408 A1* | 12/2010 | Sankaran et al. ............... 705/11 |
| 2011/0010245 A1 | 1/2011 | Priebatsch et al. |
| 2011/0029359 A1 | 2/2011 | Roeding et al. |
| 2011/0035265 A1 | 2/2011 | King et al. |
| 2011/0035284 A1 | 2/2011 | Moshfeghi |
| 2011/0040626 A1 | 2/2011 | Lin |
| 2011/0098920 A1 | 4/2011 | Chuang et al. |
| 2011/0170837 A1 | 7/2011 | Barnes, Jr. |
| 2011/0178862 A1 | 7/2011 | Daigle |
| 2011/0178863 A1* | 7/2011 | Daigle ............... 705/14.31 |
| 2011/0189980 A1 | 8/2011 | Proulx et al. |
| 2011/0190009 A1 | 8/2011 | Gerber, Jr. et al. |
| 2011/0238476 A1 | 9/2011 | Carr et al. |
| 2011/0246306 A1 | 10/2011 | Blackhurst et al. |
| 2011/0270618 A1 | 11/2011 | Banerjee et al. |
| 2011/0270673 A1 | 11/2011 | Lin et al. |
| 2011/0274094 A1 | 11/2011 | Jovicic et al. |
| 2011/0276385 A1 | 11/2011 | Keller |

FOREIGN PATENT DOCUMENTS

| | | |
|---|---|---|
| WO | 2010112819 A1 | 10/2010 |
| WO | 2011080517 A2 | 7/2011 |

* cited by examiner

SYSTEM AND METHOD FOR MANAGING INDOOR GEOLOCATION CONVERSIONS

CROSS-REFERENCE TO RELATED APPLICATIONS

The present application is a continuation of U.S. patent application Ser. No. 14/445,582, filed Jul. 29, 2014 which is a divisional of U.S. patent application Ser. No. 13/431,141, filed Mar. 27, 2012, the disclosure of which is incorporated herein by reference.

BACKGROUND

Modern Smartphone devices are equipped with location-based features. These devices use signals from GPS satellites to identify a location, determine a direction of motion, and other navigation functions. Typically, in locations where the GPS satellite signals are weak (e.g., indoors) GPS may not function well or at all. To provide indoor navigation, some devices may use other information such as wireless network signals, Bluetooth signals, compass data, and accelerometer data as well as existing floor plans and pre-generated databases or indices of measurement.

SUMMARY

One aspect of the present technology discloses a method of providing advertisements. The method includes receiving signals from a wireless mobile device within an indoor space. In some aspects, signals include at least one of information relative to a location of the mobile device, network browsing history, and a transaction made using the mobile device. In one aspect, information relative to the location of the mobile device includes wireless network signals. The method also includes, using a processor to determine intent of a user of the mobile device based on the received signals, selecting at least one advertisement associated with the determined intent and transmitting the selected advertisement to the mobile device.

The method may include calculating a first position of the mobile device using map information of the indoor space and determining the first position by comparing the map information to the received signals. The map information may be based on a plurality of constraints which define areas where the user may not walk. Further, the method may include providing navigational information from the first position to a second position associated with the selected advertisement. The provided navigational information includes determining a route around the plurality of constraints between the first position and the second position and transmitting the route.

Another aspect of the present technology discloses a system for providing advertisements, comprising a processor and a memory accessible by the processor. The memory may store map information of an indoor space. The processor may be coupled to the memory. The processor may be configured to receive signals from a wireless mobile device within the indoor space. The signals include at least one of information relative to a location of the mobile device, network browsing history and a transaction made using the mobile device. In one aspect, information relative to the location of the mobile device may include wireless network signals. The processor may be also configured to determine intent of a user of the mobile device based on the received signals, select at least one advertisement associated with the determined intent and transmit the selected advertisement to the mobile device.

The system may also include the processor being configured to calculate a first position of the mobile device using map information of the indoor space and determine the first position by comparing the map information to the received signals. In some aspects, the map information may be based on a plurality of constraints which define areas where the user may not walk. Further, the processor may be configured to provide navigational information from the first position to a second position associated with the advertisement.

Yet another aspect of the present technology discloses a method of providing advertisements. The method includes receiving first signals from a wireless mobile device within an indoor space. The signals include at least one of information relative to a location of the mobile device and network browsing history. The method also includes, using a processor to determine a first intent of a user of the mobile device based on the received signals, selecting a first advertisement associated with the first intent, transmitting the first advertisement to the mobile device and determining whether a conversion event associated with the first advertisement occurred. If a conversion event associated with the first advertisement occurred, the method further includes, determining a second intent of the user based on the conversion event, selecting a second advertisement associated with the second intent and transmitting the second advertisement to the mobile device.

DETAILED DESCRIPTION

Aspects, features and advantages of this disclosure will be appreciated when considered with reference to the following description and accompanying figures. It should be noted that the same reference numbers in different drawings may identify the same or similar elements.

In this disclosure, systems and methods are provided for managing indoor geolocation conversions. Geolocation is a process of identifying a real-world geographic location of an object. According to aspects, an indoor space in a geographic location can be modeled using a device such as a mobile phone.

In some aspects, geolocation models may be used to transmit advertisements to a client device (e.g., mobile phone)

based on a targeting mechanism. For example, a user carrying a mobile phone may be targeted with advertisements on that phone related to the user's current location (e.g., inside a store or shopping mall) and for items they may have been searching for (e.g., using a search engine, price check application, etc.). The advertisement may encourage the user to go to a particular location in an indoor space, for example, to redeem a coupon.

When advertisements for an item are displayed on the client device, a user of the client device may be given directions to the item based on location information provided via the client device. The user's arrival at a particular location can be verified by way of, e.g., redemption of coupons and gift cards. The advertisements may also load balance particular events. For example, the advertisements may request that users show up to a location at a pre-determined time in order to receive a discount (e.g., a user may receive an extra discount on an item if they arrive at the pre-determined time). This may allow an advertiser to manage a number of users at a particular location.

Figure 1:
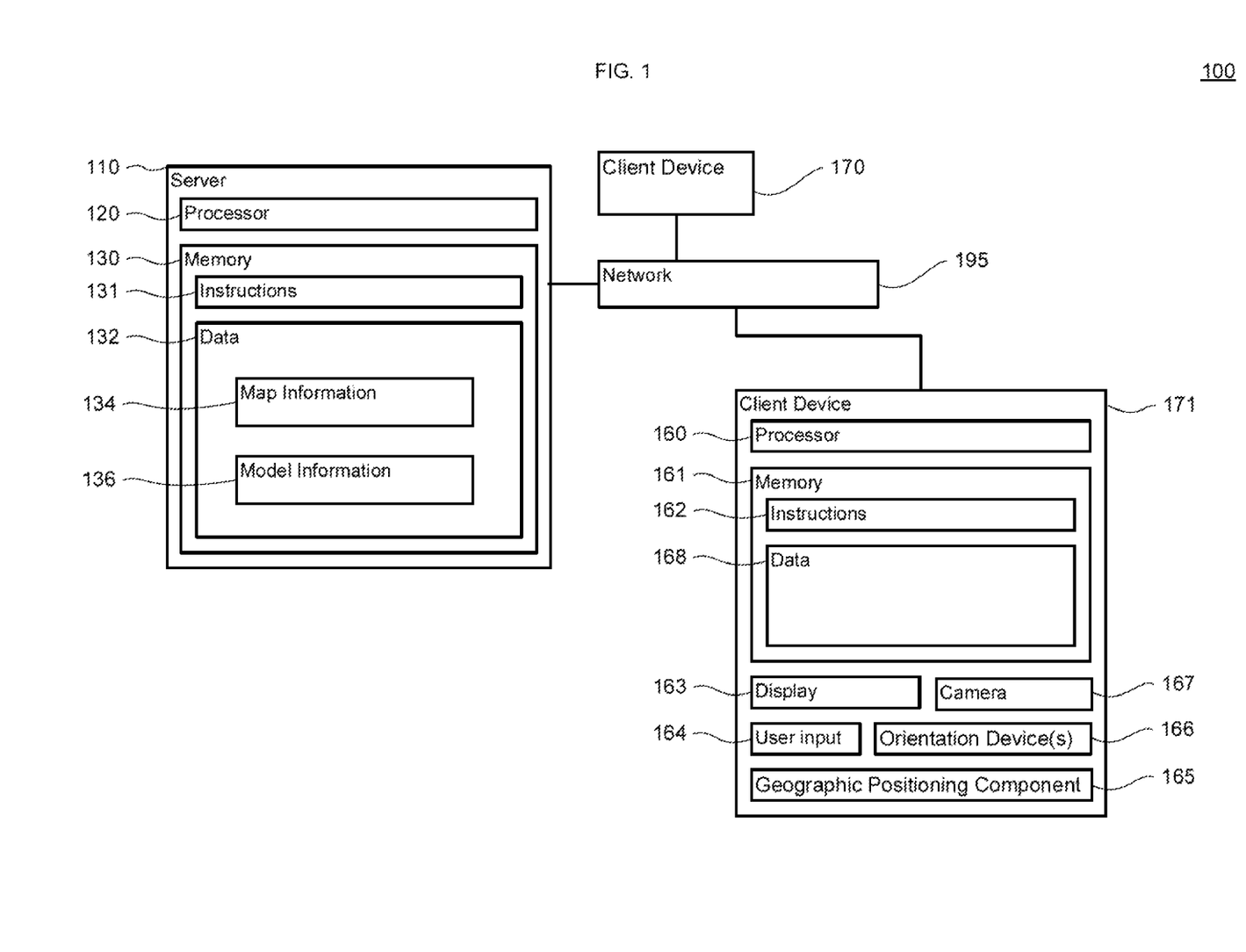
FIG. 1 is a functional diagram of a system in accordance with the disclosure.

FIG. 1 is a functional diagram of a system 100, which may include a server 110 coupled to a network 195. The system 100 may also include a number of client devices 170 and 171 capable of wireless communication with the server 110 over the network 195.

The server 110 may contain a processor 120, memory 130, and other components typically present in general purpose computers. The memory 130 of server 110 may store information accessible by the processor 120, including instructions 131 that may be executed by the processor 120. Memory may also include data 132 that can be retrieved, manipulated or stored by the processor 120. The memory 130 may be a type of non-transitory computer readable medium capable of storing information accessible by the processor 120, such as a hard-drive, memory card, ROM, RAM, DVD, CD-ROM, write-capable, and read-only memories. The processor 120 may be a well-known processor, such as processors from Intel Corporation or Advanced Micro Devices. Alternatively, the processor 120 may be a dedicated controller such as an ASIC.

Although FIG. 1 functionally illustrates the processor 120 and memory 130 as being within the same block, it will be understood by those of ordinary skill in the art that the processor 120 and memory 130 may actually comprise multiple processors and memories that may or may not be stored within the same physical housing. For example, some of the instructions 131 and data 132 may be stored on a removable CD-ROM and others within a read-only computer chip. Some or all of the instructions 131 and data 132 may be stored in a location physically remote from, yet still accessible by, the processor 120. Similarly, the processor 120 may actually comprise a collection of processors, which may or may not operate in parallel.

The instructions 131 may be a set of instructions to be executed directly (such as machine code) or indirectly (such as scripts) by the processor 120. For example, the instructions 131 may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 132 may be retrieved, stored or modified by processor 120 in accordance with the instructions 131. For instance, although the system and method is not limited by any particular data structure, the data 132 may be stored in computer registers, in a relational database as a table having a plurality of different fields and records, XML documents or flat files. The data 132 may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 132 may comprise information sufficient to identify the relevant information, such as numbers, descriptive text, proprietary codes, references to data stored in other areas of the same memory or different memories (including other network locations) or information that is used by a function to calculate the relevant data.

Data 132 of server 110 may include model information 136. For example, a model may include a set of locations associated with an indoor space. Each location of the set of locations may be associated with wireless network access point data describing the expected wireless network access point signals and corresponding signal strengths expected to be detected by a device scanning for such signals at different locations of the map. The expected wireless network access point signals may be specific values or may be a range of values. It should be noted that a set of locations for an indoor space may also be associated with and/or determined based on various signals, such as radio frequency (RF) signals, light, sound image recognition signals, and other types of signals and/or environmental factors or any combination of these. For example, the signals may have been recorded from a number of previous scan of the indoor space using a mobile device such as client device 171. In some aspects, a model of the indoor space may be generated from each type of signal described above, and then stored in data 132.

The server 120 may access map information 134. As described in more detail below, the map information may include a series of floor plans representing an indoor space within a building. According to aspects, the map information 134 may be based upon a series of walls representing locations where a user may not walk (or is not able to walk) within the building. These floor plan features may enable users to identify various areas of an indoor space. In some aspects, all or a portion of the map information 134 may be transmitted as needed to client devices 170 and 171 for storage there as well.

Each client device 170 and 171 may be configured similarly to the server 110, with a processor 160, memory 161 and instructions 162 as described above. Each client device 170 and 171 may be a personal computing device and have all of the components normally used in connection with a personal computer such as a central processing unit (CPU) 160, memory 161 (e.g., RAM and internal hard drives) storing data 168 and instructions 161, an electronic display 163 (e.g., a monitor having a screen, a touch-screen, a projector, a television, a computer printer or other device that is operable to display information), and end user input 164 (e.g., a mouse, keyboard, touch screen or microphone). The client device 171 may also include a camera 167, speakers, a network interface device, and all of the components used for connecting these elements to one another.

As shown in FIG. 1, the client device 171 may also include a geographic position component 165, to determine the geographic location of the client device 171. For example, client device 171 may include a GPS receiver to determine the device's latitude, longitude and altitude position. Thus, as the client device 171 changes location, for example by being physically moved, the GPS receiver may determine a new current location. The component 165 may also comprise software for determining the position of the client device 171 based on other signals received at the client device 171, such as signals received from one or more wireless network access points.

To determine the direction in which the client device 171 is oriented, the device 171 may also include one or more orientation devices 166 such as an accelerometer, gyroscope, compass, or any combination of these. For example, an accelerometer may be used to detect the effect of gravity on the client device 171 measured, for example, in meters per second. By way of example only, the client device 171 may use input from the accelerometer to determine the client device's pitch, yaw or roll (or changes thereto) relative to the direction of gravity or a plane perpendicular thereto. In that regard, it will be understood that a client device's provision of orientation data as set forth herein may be provided automatically to the client device 171.

The orientation data received from the orientation device 166 may be used in various ways. For example, an accelerometer or gyroscope may be used as a pedometer by running an average of the acceleration values to identify which direction is down (towards the Earth). A simple step detector may be constructed by deciding a step has been taken each time the component in the down direction is greater than an empirically determined threshold. Using an approximate stride length or speed of a person may approximate the distance of each step.

Figure 2:
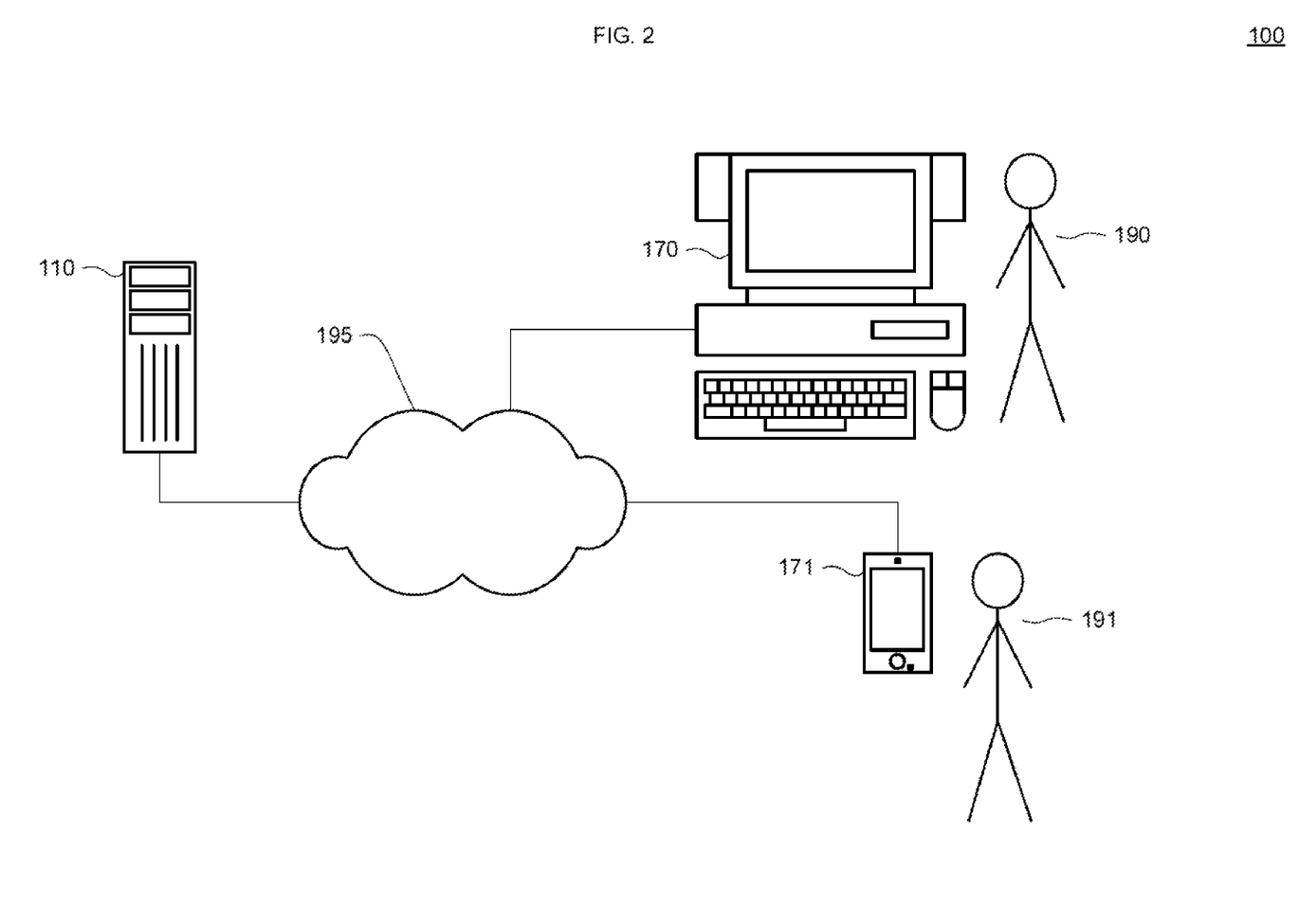
FIG. 2 is a pictorial diagram of a system in accordance with the disclosure.

FIG. 2 is a pictorial diagram of a system 100. According to some aspects, the system 100 may include client devices 170 and 171 that are capable of wireless communication over a network 195 to a server 110. By way of example only, client device 170 may be a portable personal computer such as a wireless-enabled PDA, a tablet PC, or a netbook capable of obtaining information via the Internet. A user 190 may input information using a small keyboard, a keypad, or a touch screen. Alternatively, client device 171 may also include a mobile device such as a mobile phone intended for use by a person 191.

The server 110 may be at one node of network 195 and capable of directly and indirectly communicating with other nodes of the network 195. For example, the server 110 may comprise a web server that may be capable of communicating with client devices 170 and 171 via network 195 such that it uses the network 195 to transmit and display information to a user on a display of the client device 171. Server 110 may also comprise a plurality of computers, e.g., a load balanced server farm, that exchange information with different nodes of a network for the purpose of receiving, processing and transmitting data to client devices 170 and 171. In this instance, the client devices 170 and 171 will typically still be at different nodes of the network 195 than the computers comprising server 110.

The network 195, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to a particular manner of transmission of information. For example, in some aspects, information may be sent via a medium such as a disk, tape or CD ROM. Yet further, although some functions are indicated as taking place on a single server having a single processor, various aspects of the system and method may be implemented by a plurality of servers, for example, communicating information over network 195. In addition to the components described above and illustrated in the figures, various operations will now be described.

Figure 3:
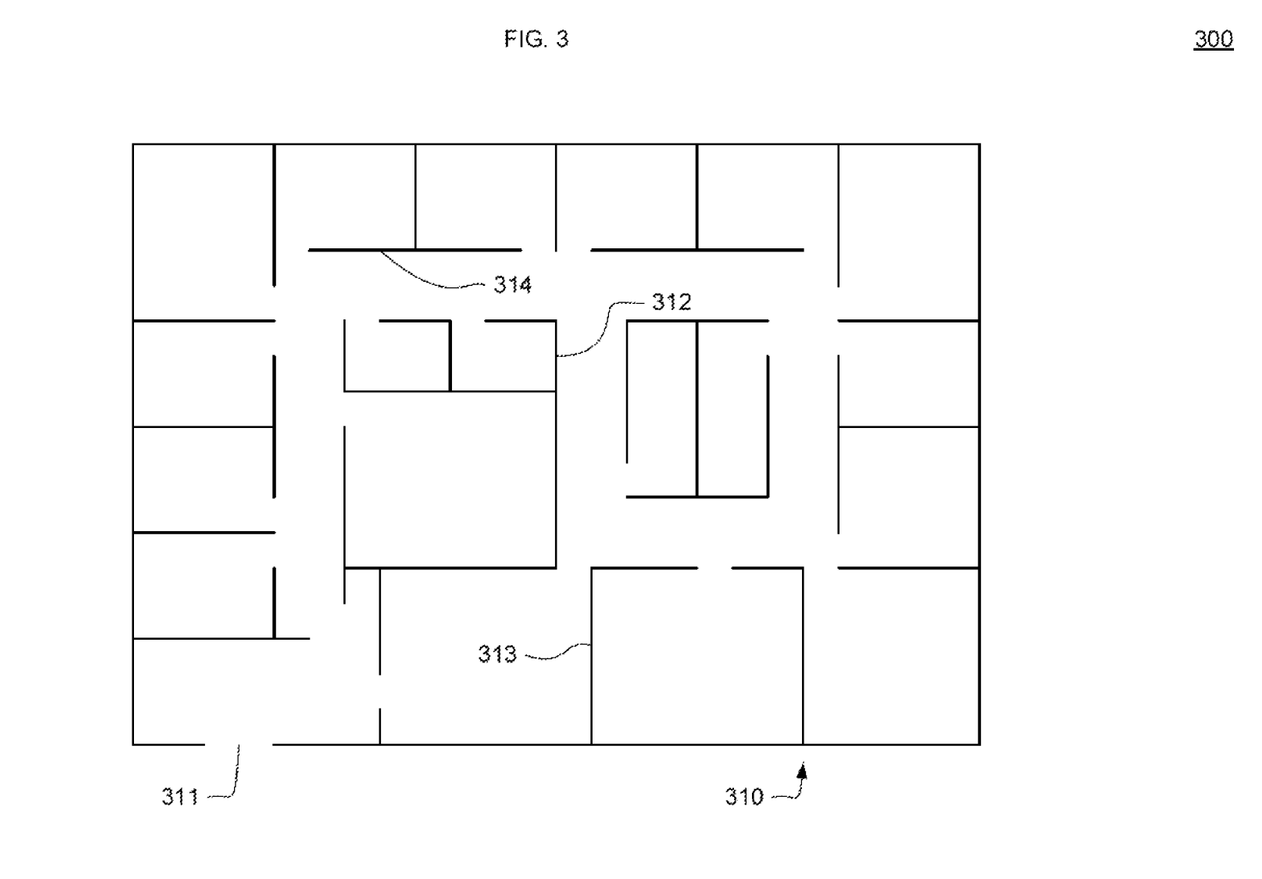
FIG. 3 is an example floor plan of an indoor space in accordance with aspects of the disclosure.

FIG. 3 is an example floor plan 310 of an indoor space 300. As described above, a client device may retrieve map information that may represent, for example, the floor plan 310 of an indoor location in a building. As shown in FIG. 3, the floor plan 310 of the indoor space 300 may include an entrance 311 and a plurality of walls (such as walls 312-314). For example, the walls 312-314 may define various rooms, hallways, etc., as well as openings (such as doorways) of the indoor space 300. The floor plan 310 features may enable users to identify various areas of the indoor space 300. For example, the floor plan may identify stores, aisles, shelving and a location of items for purchase in the indoor space 310.

A user may sign up or opt to participate (a "participant") in order to receive information c map information, advertisements, coupons, discounts, etc.) when walking their client device through the indoor space 310. Participants may be required to take an affirmative step in order to select or "opt-in" to participate. For example, participants may be required to sign in to a registration service before receiving a route or provided information. Participants may be paid for data provided and may also be provided with an explanation of how and why their feedback is being used. Similarly, participants may be provided with the opportunity to cease participation temporarily or permanently at any time. Preferably, privacy protections are provided for any user data transmitted by the client device, including, for example, anonymization of personally identifiable information, aggregation of data, filtering of sensitive information, encryption, hashing or filtering of sensitive information to remove personal attributes, time limitations on storage of information, or limitations on data use or sharing. Moreover, the data may be anonymized and aggregated such that individual user data is not revealed.

Figure 4:
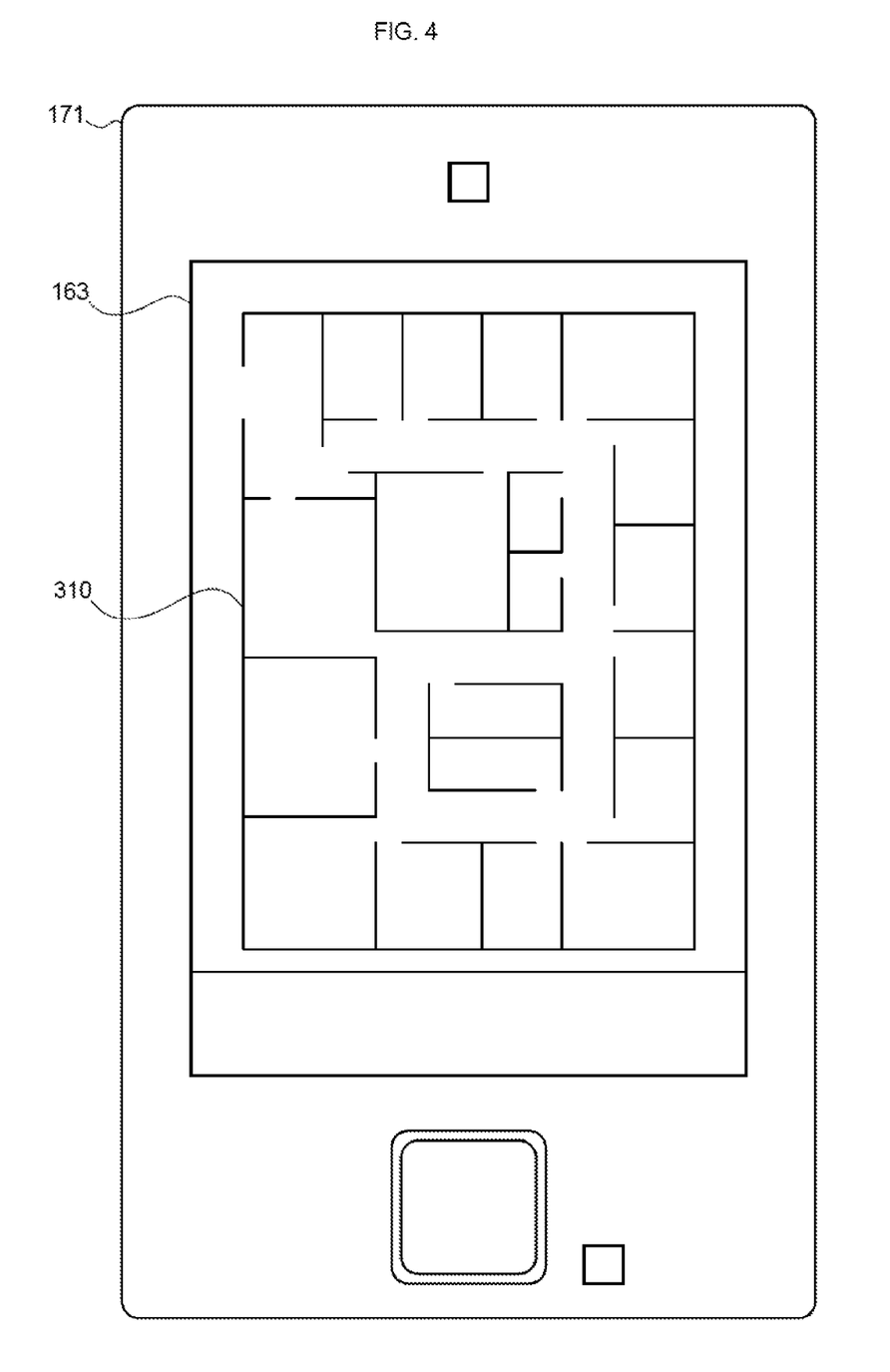
FIG. 4 is an example of a client device displaying the example floor plan of FIG. 3 in accordance with the disclosure.

FIG. 4 is an example of a client device 171 displaying the example floor plan 310 of FIG. 3. After opting to participate, the participant's client device 171 may identify a floor plan 310 of an indoor space. According to aspects, a participant may actively input the indoor location to the client device 171, for example, by selecting a point on a display or entering an address or other location identifying information. In one aspect, the participant may scan a bar code or capture an image of some other feature of the indoor space associated with a known location (for example, a picture of a door, sign, monument, or some other feature associated with a location in the indoor space).

The barcode or geolocated feature may cause the client device to identify a location to be used as a beginning location. For example, the geolocated feature or barcode may include information for identifying a location (such as by requesting information from a server). In another aspect, the client device 171 may identify a starting position based on a coarse wireless network access point proximity-based localization algorithm, for example, that makes use of a stored set of wireless network access point locations such as a type used in a wireless access point model built of the same area. To identify an actual beginning location in the indoor space, a server may use information such as a point on a floor plan, address, GPS coordinates, code, location identifiers, etc.

As shown in FIG. 4, the client device 171 may identify a relevant floor plan 310 of the indoor space and display it on a display 163 of the client device 171. For example, the floor plan 310 may be provided to the client device 171 from a server or local memory of the client device 171. The floor plan 310 may be selected based on the bar codes or geolocated features described above, a participant's known GPS location (e.g., immediately before entering a building), an address, or any other identifying information inputted by the participant.

Figure 5:
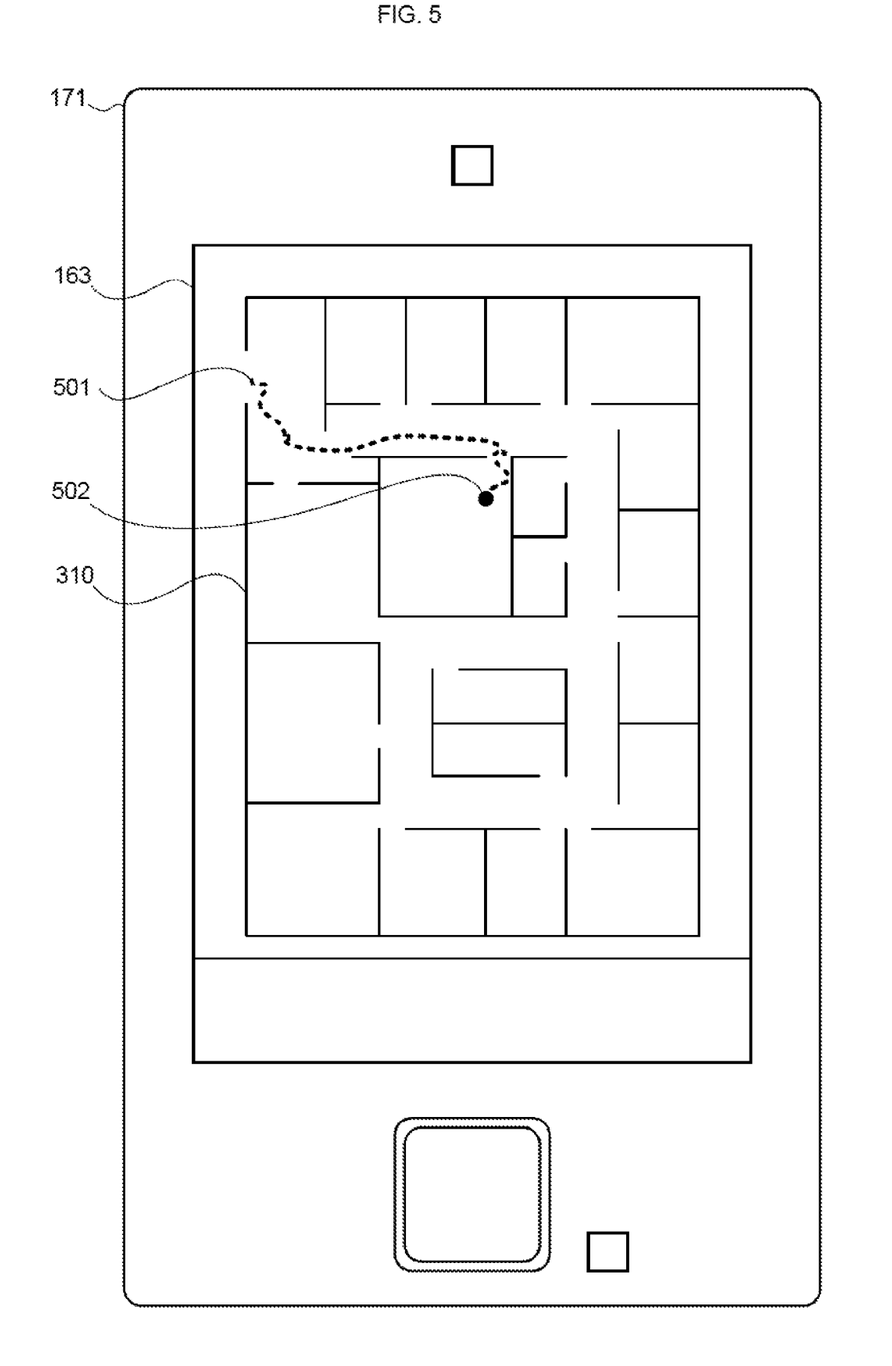
FIG. 5 is an example of the client device of FIG. 4 displaying data in accordance with one aspect the disclosure.

FIG. 5 is an example of the client device 171 of FIG. 4 displaying data. As described above, the client device 171 may utilize the display 163 to show an estimated current location 502 in the floor plan 310 of an indoor space. For example, the client device 171 may compare WiFi signals and orientation data against a generated wireless access point model of the indoor space. This may be used to estimate a current location 502 and movements of the client device 171 relative to the floor plan 310. The client device 171 may also display an estimated path 501 followed by the client device 171 to the estimated current location 502 on the floor plan 310.

According to some aspects, a participant may indicate their (and the client device's) current location. For example, the participant may use their finger to select their current location on the floor plan 310. This may be accomplished by employing a touch screen input device on the display 163 of the client device 171 or by other techniques known in the arts of obtaining user input. If an estimated current location of the client device 171 is not the same as the current location indicated by the participant, the participant's indicated location may be used to correct the client device's location as well as the path 501.

Figure 6:
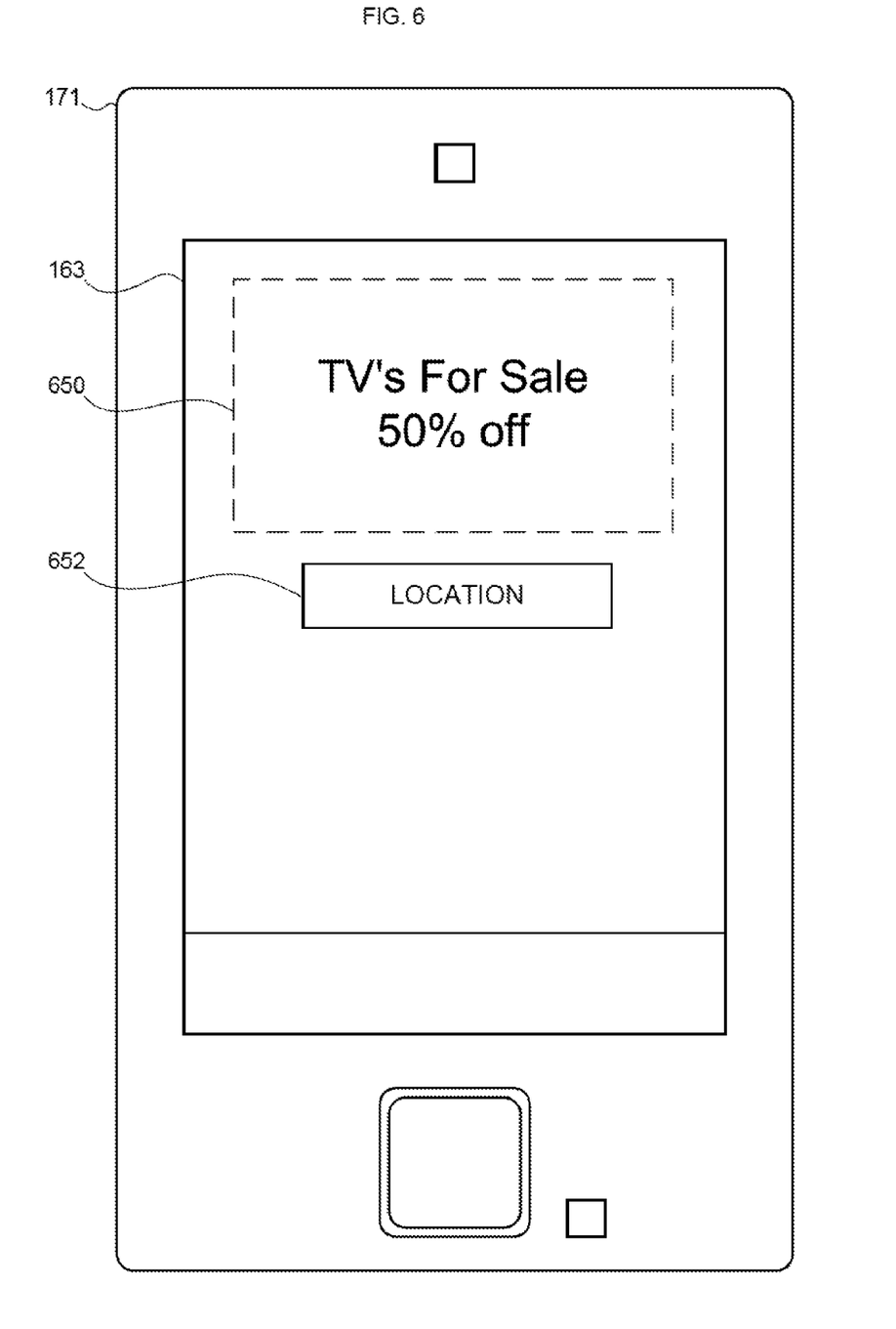
FIG. 6 is an example of the client device of FIG. 4 displaying an advertisement in accordance with one aspect of the disclosure.

FIG. 6 is an example of the client device 171 of FIG. 4 displaying an advertisement 650. While participants walk through an indoor space, the participants may receive one or more advertisements which are displayed on the client device 171. The advertisements may be relevant, e.g., to the participant's intent or location in an indoor space. For example, if a participant is lingering for a time in a television aisle, it may be determined that the participant's intent is to purchase a television.

As shown in FIG. 6, the advertisement 650 may provide information about a particular product available for purchase. According to some examples, the advertisement 650 may include a discount on a purchase of a particular item. For example, the display 163 of client device 171 shows an advertisement offering "TV's for sale 50% off." The advertisement may be displayed to a participant, for example, in a text banner, in a dedicated window, or in any other format. For example, the advertisement may be an audio clip output via the speakers of the client device 171. In one aspect, the advertisement 650 may be displayed over a floor plan of the indoor space indicating a location of the advertised item. A detailed description of the item may be included in the advertisement that describes, for example, a brand name of the item, user ratings and other relevant information pertaining to the item. The detailed description may be included in the displayed advertisement. For example, it may be attached in a link such as an html hyper link.

As a participant moves through an indoor location, other advertisements may be displayed. These advertisements may be overlaid in the participant's client display window or in a scrolling menu that may be used to track multiple advertisement listings. A participant may be alerted to the advisements present on their client device 171, for example, by vibrating the client device 171 or sounding an alarm on the client device 171. Alert settings used to notify a participant can be pre-determined by a system administrator or chosen by the participant at any time.

A location mechanism 652, such as a button or selectable feature on the display 652, may be displayed in association with the advertisement 650. By activating the location mechanism 652, the participant may be provided with a location of the advertised item. For example, the location mechanism can be a programmable radio button 652 made visible on the display 163 that can be employed by touching the display screen 163. Upon activating the location mechanism 652, a display mapping a path to the item may be presented to the participant, for example, as shown in FIG. 7.

Figure 7:
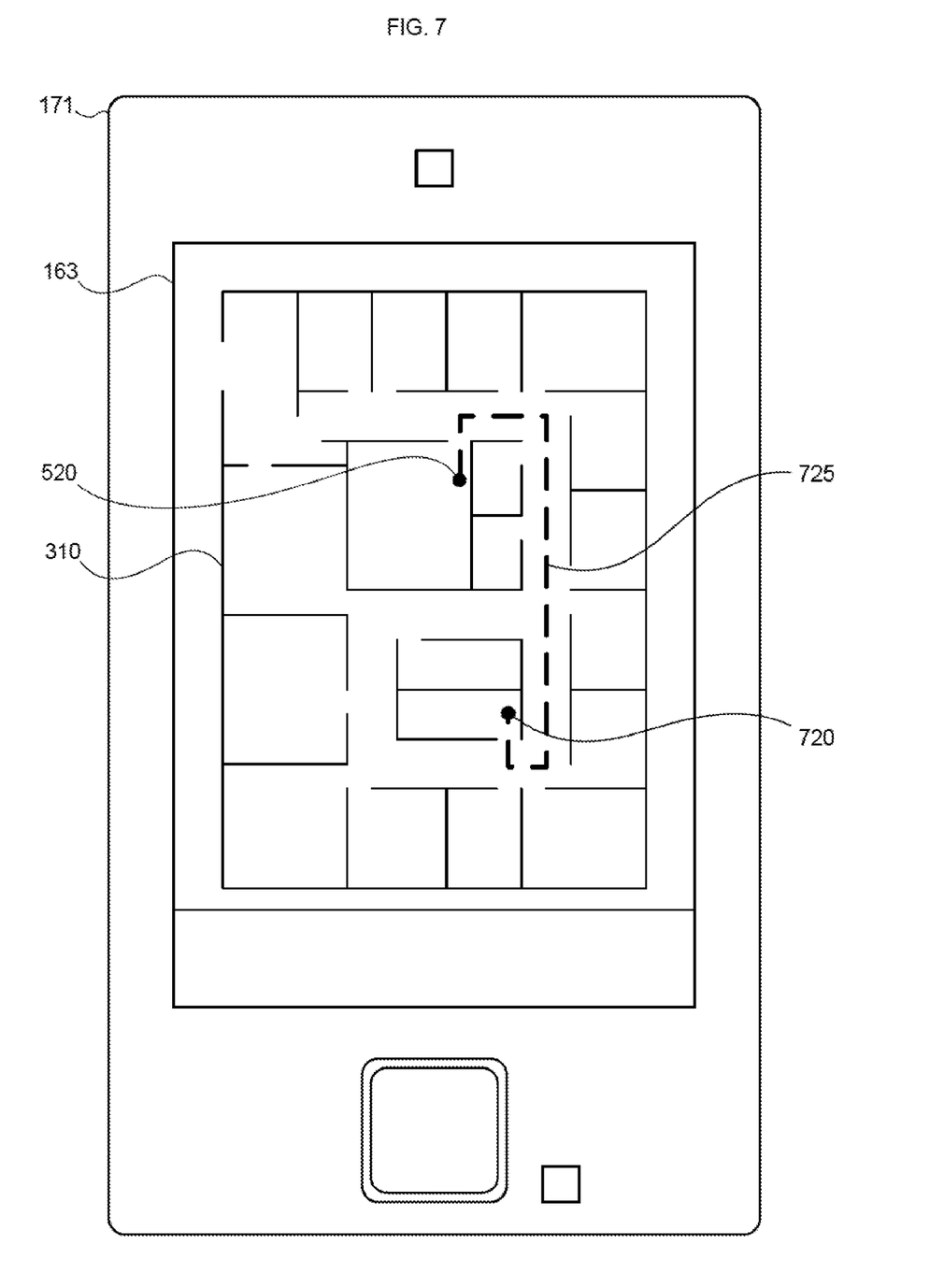
FIG. 7 is an example of the client device of FIG. 4 displaying data associated with the advertisement of FIG. 6 in accordance with one aspect of the disclosure.

FIG. 7 is an example of the client device 171 of FIG. 4 displaying data associated with the advertisement 650 of FIG. 6. As shown in FIG. 7, the display 163 on the client device 171 may show a path 725 from the participant's current location 520 to the advertised item. The path 725 may be displayed relative to the floor plan 131. The path 725 may indicate an optimal route that a participant may take from their current estimated location 520 to a destination location 720 of the item. For example, the path 725 may be determined by dead reckoning (e.g., a process of calculating a current position by using a previously determined position) calculations between the current estimated location and orientation information retrieved from the client device 171. The path 725 may also be based on previously generated pre-determined models of the indoor space. As result of the pre-determined models, the path 725 to an advertised item may be altered based on certain areas in the indoor space at or through which the client device 171 may not go, e.g., a wall or enclosure.

Figure 8:
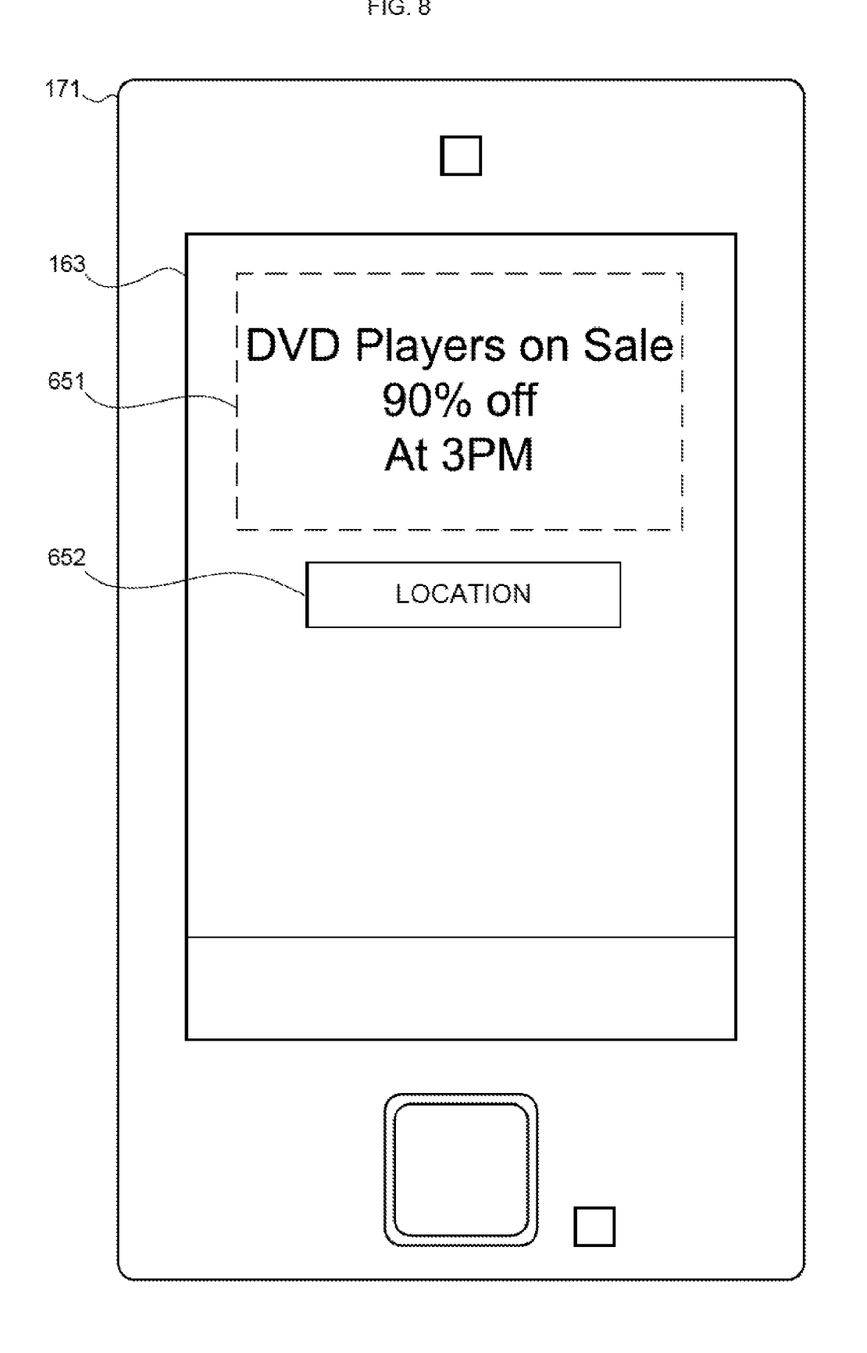
FIG. 8 is an example of the client device of FIG. 4 displaying another advertisement in accordance with one aspect of the disclosure.

FIG. 8 is an example of the client device 171 of FIG. 4 displaying another advertisement 651. As shown in this example, the advertisement 651 may be used to load balance specific events. For example, the advertisement 651 may request that participants show up to a location at different times or that a specific discount may be offered for an item at particular time. For example, the advertisement 651 for 90% off DVD players at 3 pm may be sent to a first group of participants, while another advertisement for 70% off DVD players at 12 pm may be sent to a second group of participants. This may help to ensure that only a pre-determined number of users are in a location at a time, and thus, for example, prevent overcrowding and long lines at a particular store. This may further be advantageous when a certain product is in high demand or of limited supply.

As previously discussed, the advertisements may be relevant to a participant's intent in a specific indoor location. The participant's intent may also be determined based on various purchases made by the participant. For example, if a participant buys a television they may also be interested in items associated with the television such as a video game system or a DVD player. In this instance, additional advertisements may be transmitted to the participant related to the television purchase. For example, if the advertisement 650 of FIG. 6 results in a conversion event (e.g., a coupon is redeemed or it is determined that the participant arrived at the location 720), the advertisement 651 for a discount on DVD players may be transmitted to the participant.

Figure 9:
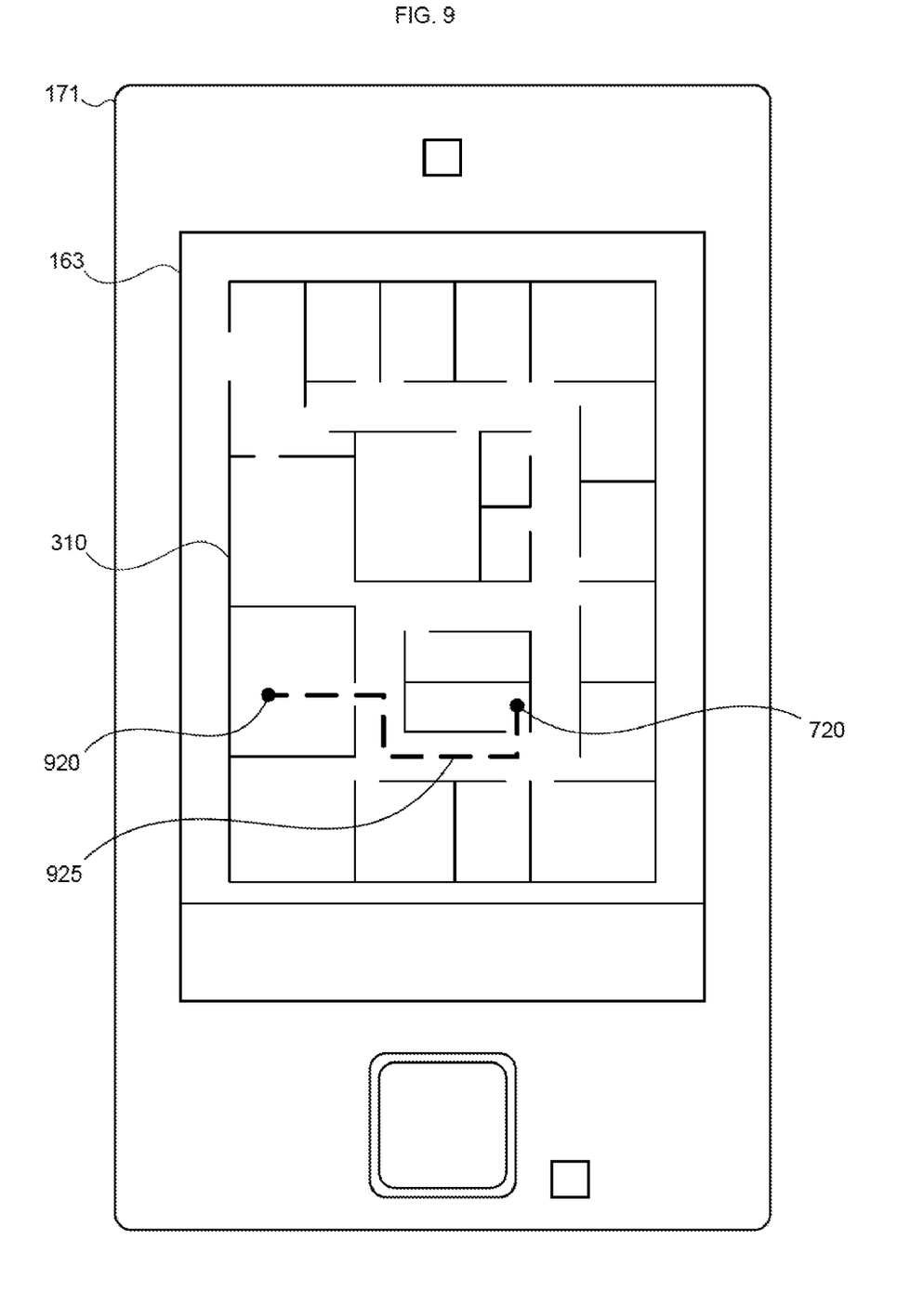
FIG. 9 is an example of the client device of FIG. 4 displaying an example of data relative to the advertisement of FIG. 8.

FIG. 9 is an example of the client device 171 of FIG. 4 displaying an example of data relative to the advertisement 651 of FIG. 8. The participant's client device 171 may indicate a path 925 the participant may take from a first conversion event (e.g., the purchase of the television) to another item related to the participant's newly determined intent. The path 925 may indicate an optimal route that the participant may take from their current estimated location 720 to a destination 920 of the related item. In one aspect, the path 925 may also direct the participant past further items related to the participant's newly determined intent. For example, the path 925 may be calculated to take the user past other related items for purchase such as a video game system, television stand or an information booth for a cable or satellite TV service provider.

Figure 10:
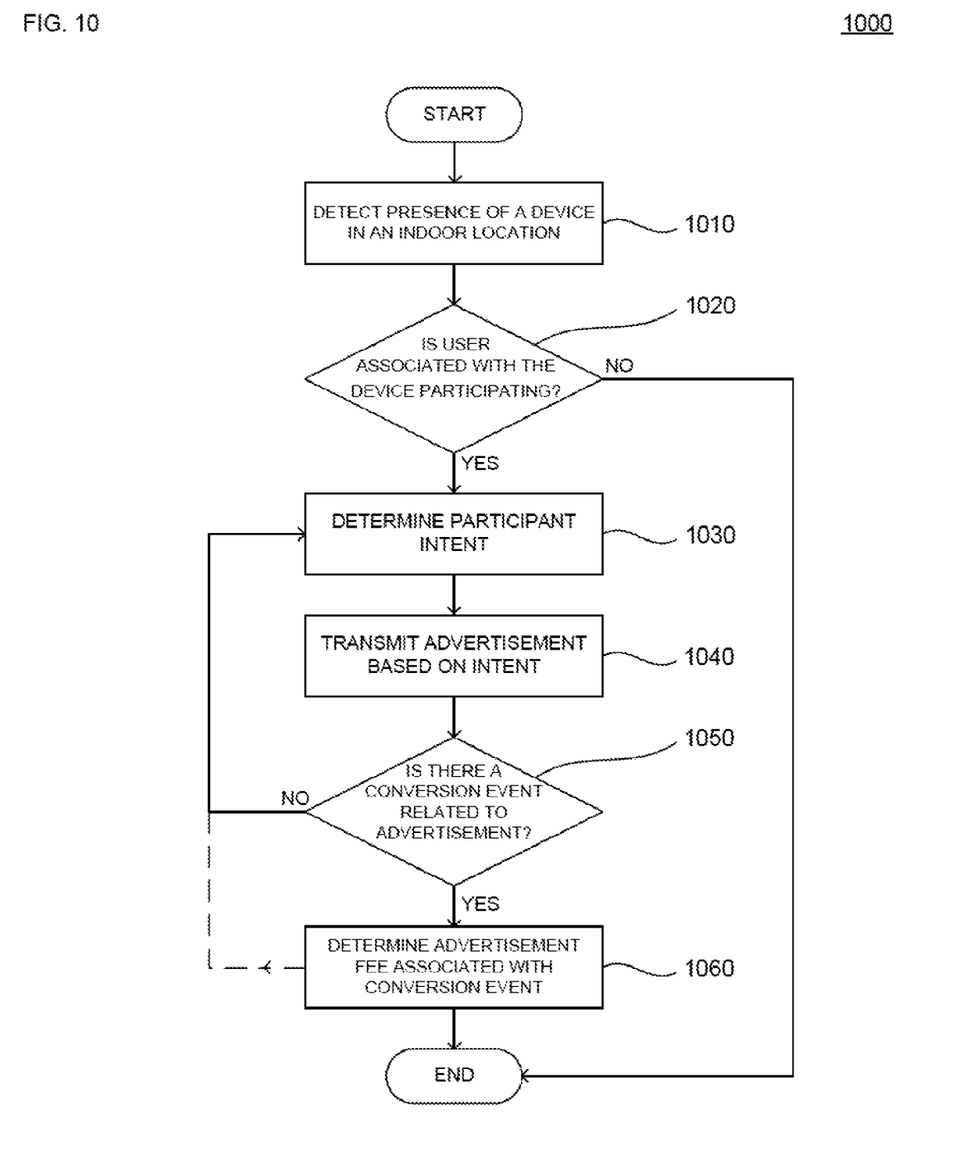
FIG. 10 is a flow diagram illustrating a method of managing geolocation conversions through targeted advertisements according to aspects of the disclosure.

FIG. 10 is a flow diagram illustrating a method 1000 of managing geolocation conversions through targeted advertisements. As mentioned above, targeting participants for advertisements may involve determining the participant's intent. For example, a participant's location in an indoor location may indicate their interest in a particular item for purchase. In this instance, information about special pricing or preferences for popular brands may encourage the participant in making a purchase. While various stages of the method 1000 are illustrated and described in a particular order, it should be understood that these stages do not have to be performed in this order. Rather, various stages may be handled in a different order or simultaneously, and stages may also be added or omitted unless otherwise stated.

At stage 1010, a client device may be detected in an indoor location. The detection may be performed at the client device or at a network node such as a server described with respect to FIG. 1. When the client device enters an indoor space, the client device may access a floor plan associated with the indoor space. For example, a user may activate or log into an application and the client device may transmit user and location information to a network server in order to download a floor plan for the indoor space. This may occur automatically, for example, by detecting the user's last known location before GPS signals received by the client device indicate that the device has moved indoors. The client device may use this information to request the floor plan of the indoor space.

Alternatively, a user may access an application and select the location of a floor plan for the indoor space by inputting a name or other identifier of the indoor space such as an address, geographic location coordinates, etc. In response, a network server may transmit all or a portion of the floor plan to the client device. In some aspects, such as where the user has previously entered the indoor space or where the floor plan is packaged with an application, the floor plan may be pre-stored at the client device.

At stage 1020, it may be determined whether a user associated with the client device desires to participate in receiving advertisements. The user may sign up or opt to participate when walking their client device through the indoor space in order to receive information (e.g., advertisements, coupons, and etc.). Participants may be required to take an affirmative step in order to select or "opt-in" to participate. For example, participants may be required to sign in to a service before receiving a route or are provided information. Similarly, participants may be provided with the opportunity to cease participation temporarily or permanently at any time. If it is determined that a user is participating, method 1000 may proceed to stage 1030; otherwise it may end.

At stage 1030, a participant's intent in an indoor location may be determined. According to aspects, one way of determining a participant's intent may be by their location in the indoor space. For example, if a participant is lingering for a time in a television aisle, it may be determined that the participant is shopping for a television. As previously discussed, the client device (e.g., the participant's mobile phone) may determine the participant's geolocation. For example, the client device may use WiFi signals and orientation data from the device such as an accelerometer, gyroscope, compass, or any combination of these. This information may be compared against a generated wireless access model of an indoor space to estimate a current location and movements of the client device relative to the indoor space. In one aspect, a participant may indicate the participant's (and the client device's) current location, for example, by indicating it on a floor plan of the indoor space displayed on the client device or by scanning a bar code.

In some aspects, a participant's intent may be determined by a questionnaire. The questionnaire may be provided to the participant via their client device when they enter an indoor location. The participant's responses to the questionnaire may indicate various products of interest to the participant. For example, the participant may be asked:

Which products are you looking for (if any)?
a) Electronics
b) Furniture
c) Groceries
d) Housewares
e) Entertainment
f) Restaurants
g) Other
h) None Based on the participant responses further questions may be displayed to refine a determination of the participant's intent. Similarly here, participants may be provided with the opportunity to cease participation in the questionnaire temporarily or permanently at any time.

In some aspects, responses to the questionnaires may be stored, for example, in a database. The questions and corresponding responses may be compared (e.g., using an algorithm) to other participant responses in order to develop location profiles. The profiles may be used to further determined participant intent. For example, the profiles may indicate that in certain indoor locations specific participants (e.g., teenagers, men, women, mothers, etc.) may be interested in particular items.

In yet another aspect, a participant's intent may be determined by the participant's relevant activities. For example, a participant may allow access to their web browser history. From past web searches, the participant's current intent in the indoor location can be assessed. In addition, certain products purchased by the participant can also be used to determine if the participant desires further related products. For example, if a participant purchases a television, they may also be interested in other items used with a television such as a DVD player, TV stand, video game system, etc.

At stage 1040, advertisements may be transmitted to the client device based on a participant's intent. The advertisements may be targeted based on the determined intent. The advertisement may be displayed to a participant as a text banner or in a dedicated window. An advertisement can be information that includes, for example, a sale price or coupon, a brand name of an item, user ratings, and an item's location with directions to and within a merchant's store as well as other relevant information.

At stage 1050, it may be determined whether a conversion event occurred that is associated with the advertisement. According to aspects, a conversion event can be an event that occurs as a result of an advertisement being displayed on a participant's client device. For example, a conversion event can be when a participant redeems a coupon that was included in an advertisement. In this regard, the mobile device may facilitate redemption of the coupon. For example, the client device may display a coupon bar code that can be scanned at a check out register. The device may also transmit the coupon via an Infrared (IR) interface coupled to the device. Other types of wireless communication protocols may also be used to transmit the coupon from the client device.

The conversion events may also include a participant going to a location in the indoor space, waiting for a particular time before entering a space, or any other event which suggests that the participant utilized the advertisement. According to some aspects, a temporal limitation may be associated with the determination of whether a conversion event occurred. For example, it may be periodically determined whether a conversion event related to the advertisement took place for 4 hours. After that time period, for example, it may be assumed that the participant will not respond to the advertisement. If a conversion event is detected, method 1000 may proceed to stage 1060. Otherwise method 1000 may repeat stage 1030 to further refine a determination of the participant's intent.

At stage 1060, a fee may be associated with the conversion event. In this regard, an advertiser may be charged a fee related to an impact the advertisements may have had on a number of participants. For example, the fee may be based on the number of participants redeeming advertisement discounts (e.g., coupons, gift cards, etc.) or for the number of participants that arrive at specific location. The fee may be a pre-determined commission rate based on a purchase price of an item that was advertised and then subsequently purchased by a participant because of the advertisement. As previously discussed, the purchase of an item may be verified by the participant redeeming a discount (e.g. a coupon) related to an item that may have been included in an advertisement.

Based on the type of conversion event that has been completed, method 1000 may optionally return to stage 1030 to determine further interest related to the participant. For example, further interest may be determined based on the previous conversion, e.g., an item purchased. Additional advertisements related to the further interest may be provided to the participant. If a conversion event has not been completed method 1000 may end. For example, the participant may have walked out of range of a floor plan or outside of an indoor location, or the participant may have ceased participation.

The above-described aspects of the disclosure may be advantageous for managing and/or load balancing indoor geolocation conversions. By introducing techniques to track and determine the intent of participants in an indoor location, services may be provided to attract the participants to certain merchants, thereby increasing the merchant's foot traffic and possible sales. Moreover, the various techniques and parameters disclosed within may be further reconfigured to refine an understanding of why a participant may be at a particular location and/or manage participants in the location.

Although the present technology has been described with reference to particular examples, it should be understood that these examples are merely illustrative of the principles and applications of the subject matter of this disclosure. For example, it should be understood that the described systems and methods can be performed in part or in their entirety on a mobile client device (e.g., a mobile phone), on a remote computing device (e.g., a server), or on some combination thereof. Additionally, it should be understood that numerous other modifications could be made to the illustrative examples. However, these and other arrangements may be devised without departing from the spirit and scope of the subject matter defined by the appended claims.

The invention claimed is:

1. A method of providing advertisements, comprising:
    detecting, by one or more processors, a first position of a wireless device within an indoor space;
    determining, by the one or more processors, an intent of a user of the wireless device related to both the first position of the wireless device and an item for purchase;
    determining, by the one or more processors, a number of users having an intent that is related to the item for purchase;
    selecting, by the one or more processors, a time value based on the number of users;
    generating, by the one or more processors, an advertisement for the item for purchase and the time value;
    providing for presentation at the wireless device, the advertisement;
    generating, by the one or more processors, a route between the first position and a second position associated with the advertisement, the route being arranged to direct the user to take a calculated path past one or more pre-determined items for purchase related to the determined intent;
    providing for presentation at the wireless device, the generated route;
    determining, by the one or more processors, whether a conversion event related to the determined intent has occurred; and
    when the conversion event has occurred, providing, by the one or more processors, a fee associated with the advertisement.

2. The method of claim 1, wherein detecting the first position of the wireless device includes receiving data related to at least one of a location of the wireless device, wireless network signals, GPS signals, and a transaction made using the wireless device.

3. The method of claim 1, further comprising providing indoor navigational information around one or more constraints in the indoor space from the first position to the second position in accordance with the generated route.

4. The method of claim 1, wherein the conversion event includes the wireless device reaching a location relative to the second position.

5. The method of claim 1, wherein the provided advertisement includes a time limitation and the conversion event includes the wireless device reaching a location relative to the second position before the time limitation has expired.

6. The method of claim 1, wherein the provided advertisement includes a coupon and the conversion event includes redemption of the coupon.

7. The method of claim 1, wherein the conversion event includes the wireless device moving along the generated route.

8. The method of claim 7, wherein the conversion event includes a purchase using the wireless device of an item located along the generated route.

9. A non-transitory computer-readable storage medium storing instructions thereon, the instructions when executed by one or more processors, cause the processors to:
    detect a first position of a wireless device within an indoor space;
    determine an intent of a user of the wireless device related to both the first position of the wireless device and an item for purchase;
    determine a number of users having an intent that is related to the item for purchase;
    select a time value based on the number of users;
    generate an advertisement for the item for purchase and the time value;
    provide for presentation at the wireless device, the advertisement;
    generate a route between the first position and a second position associated with the advertisement, the route being arranged to direct the user to take a calculated path past one or more pre-determined items for purchase related to the determined intent;

provide for presentation at the wireless device, the generated route;

determine whether a conversion event related to the determined intent has occurred; when the conversion event has occurred, and provide a fee associated with the advertisement.

10. The computer-readable storage medium of claim 9, wherein the conversion event includes the wireless device reaching a location relative to the second position.

11. The computer-readable storage medium of claim 9, wherein the advertisement includes a time limitation and the conversion event includes the wireless device reaching a location relative to the second position before the time limitation has expired.

12. The computer-readable storage medium of claim 9, wherein the advertisement includes a coupon and the conversion event includes redemption of the coupon.

13. A system, comprising:
a memory configured to store a plurality of advertisements for items and fees associated with each of the advertisements; and
one or more processors coupled to the memory, the processors being programmed to:
detect a first position of a wireless device within an indoor space;
determine an intent of a user of the wireless device related to both the first position of the wireless device and an item for purchase;
determine a number of users having an intent that is related to the item for purchase;
select a time value based on the number of users;
generate an advertisement for the item for purchase a using the plurality of advertisements and the time value;
provide for presentation at the wireless device, the advertisement;
generate a route between the first position and a second position associated with the advertisement, the route being arranged to direct the user to take a calculated path past one or more pre-determined items for purchase related to the determined intent;
provide for presentation at the display of the wireless device, the generated route; and
determine whether a conversion event related to the determined intent has occurred; and
when the conversion event has occurred, provide a fee from memory associated with the advertisement.

14. The system of claim 13, wherein detecting the first position of the wireless device includes receiving data related to at least one of a location of the wireless device, wireless network signals, GPS signals, and a transaction made using the wireless device.

15. The system of claim 13, wherein the one or more processors are further configured to provide indoor navigational information around one or more constraints from the first position to the second position in accordance with the generated route.

16. The system of claim 13, wherein the conversion event includes the wireless device reaching a location relative to the second position.

17. The system of claim 13, wherein the advertisement includes a time limitation and the conversion event includes the wireless device reaching a location relative to the second position before the time limitation has expired.

18. The system of claim 13, wherein the advertisement includes a coupon and the conversion event includes redemption of the coupon.

19. The system of claim 13, wherein the conversion event includes the wireless device moving along the generated route.

20. The system of claim 19, wherein the conversion event includes a purchase using the wireless device of an item located along the generated route.

* * * * *